United States Patent
Qian et al.

(10) Patent No.: US 10,940,697 B2
(45) Date of Patent: Mar. 9, 2021

(54) IMAGE GENERATION ON A TRANSPARENT OR SEMITRANSPARENT SUBSTRATE

(71) Applicant: Hewlett-Packard Development Company, L.P., Spring, TX (US)

(72) Inventors: Li Qian, Sant Cugat del Valles (ES); Mihail Zverev, Sant Cugat del Valles (ES); Eduardo Amela Conesa, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,736

(22) PCT Filed: Apr. 23, 2018

(86) PCT No.: PCT/US2018/028850
§ 371 (c)(1),
(2) Date: Sep. 2, 2020

(87) PCT Pub. No.: WO2019/209249
PCT Pub. Date: Oct. 31, 2019

(65) Prior Publication Data
US 2021/0031537 A1 Feb. 4, 2021

(51) Int. Cl.
*B41J 3/60* (2006.01)
*B41J 29/393* (2006.01)
(Continued)

(52) U.S. Cl.
CPC ............ *B41J 2/2132* (2013.01); *B41J 3/407* (2013.01); *B41J 3/60* (2013.01); *B41J 29/393* (2013.01)

(58) Field of Classification Search
CPC .......... B41J 3/60; B41J 29/393; B41J 2/2132
See application file for complete search history.

(56) References Cited

U.S. PATENT DOCUMENTS 7,562,957 B2 * 7/2009 Mills ...................... B41J 2/2114
347/15
2010/0110470 A1 5/2010 Teshima
(Continued)

FOREIGN PATENT DOCUMENTS

EP 1535738 6/2005
GB 2409122 6/2005
(Continued)

OTHER PUBLICATIONS

International Search Report and Written Opinion dated Feb. 27, 2018, PCT Patent Application No. PCT/2018/028850, filed Apr. 23, 2018, Federal Institute of Industrial Property, Moscow, Russia, 7 pages.

(Continued)

*Primary Examiner* — Scott A Richmond
(74) *Attorney, Agent, or Firm* — HP Inc. Patent Department

(57) ABSTRACT

A method of generating an image on a transparent or semitransparent substrate, the method comprising analyzing a first image to be printed on a first side of the substrate to identify a region associated with a predominant color, printing, on the first side of the substrate a color patch with the identified predominant color, printing, on a second side of the substrate, a test color pattern overlapping with the color patch on the first side of the substrate, determining, in a transmission geometry, a color distribution in the color patch, and generating from the determined color distribution, for the region associated with the predominant color identified in the first image, a transmission mode color profile for printing on the second side of the substrate.

15 Claims, 6 Drawing Sheets

(51) Int. Cl.
  *B41J 2/21*   (2006.01)
  *B41J 3/407*  (2006.01)

(56) References Cited

U.S. PATENT DOCUMENTS

| | | |
|---|---|---|
| 2010/0238461 A1 | 9/2010 | Chauvin et al. |
| 2012/0081441 A1 | 4/2012 | Miyake et al. |
| 2012/0194592 A1* | 8/2012 | Bhaumik ............ B41J 2/17546 347/15 |
| 2013/0106936 A1 | 5/2013 | Shin et al. |

FOREIGN PATENT DOCUMENTS

| | | |
|---|---|---|
| WO | WO-2013088430 | 6/2013 |
| WO | WO-2017196301 | 11/2017 |

OTHER PUBLICATIONS

International Search Report and Written Opinion dated Feb. 27, 2018, PCT Patent Application No. PCT/US2018/028850, filed Apr. 23, 2018, Federal Institute of Industrial Property, Moscow, Russia, 7 pages.

* cited by examiner

IMAGE GENERATION ON A TRANSPARENT OR SEMITRANSPARENT SUBSTRATE

BACKGROUND

Color can be described by a numerical representation of color components, such as an RGB or CMYK value. The representation of the same perceived color can differ between different devices.

To reproduce an intended color on a substrate, a printer can use a color profile, such as an ICC (International Color Consortium) profile. The color profile creates a mapping between a color representation in the printer, which is used to produce a certain color, to a corresponding color representation of a profile connection space. The profile connection space (PCS) may be a device independent color space, such as the lab color space (CIELAB) or the CIEXYZ color space. Color representations of an input device may be transformed to color representations of an output device via the profile connection space.

BRIEF DESCRIPTION OF THE DRAWINGS

The following detailed description will best be understood with reference to the drawings, wherein.

DETAILED DESCRIPTION

To generate an image with a printer on a certain substrate, the color profile of the printer can be adapted to the type of the substrate, which is printed on, to enhance the color accuracy of the printing. When images are printed on different sides of a transparent or semitransparent substrate, interactions between the colors of the printed images on different sides can be perceived by an observer, depending on lighting conditions. Particularly, different printed images on different sides of the substrate can contribute to a perceived image and thereby modify the perceived image.

To take into account the contributions of printed images on different sides of the substrate in the perceived image generation, the color profile for printing on each side can be adjusted. The adjusted color profiles for printing on different sides of the substrate may be used to generate a composite image, i.e., a perceived image with contributions from printed images on different sides of the substrate.

To produce perceived images with high color accuracy when the perceived image is generated by printed images on different sides of the substrate, the color profiles of a printer for printing on the substrate can be adjusted depending on the to be generated perceived image, substrate type, substrate transparency, substrate orientation, and/or expected lighting conditions. More specifically, calibration techniques can be used to identify the adjusted color profile prior to printing, wherein the color profile used for printing may be a specific color profile for the to be generated perceived image.

Figure 1:
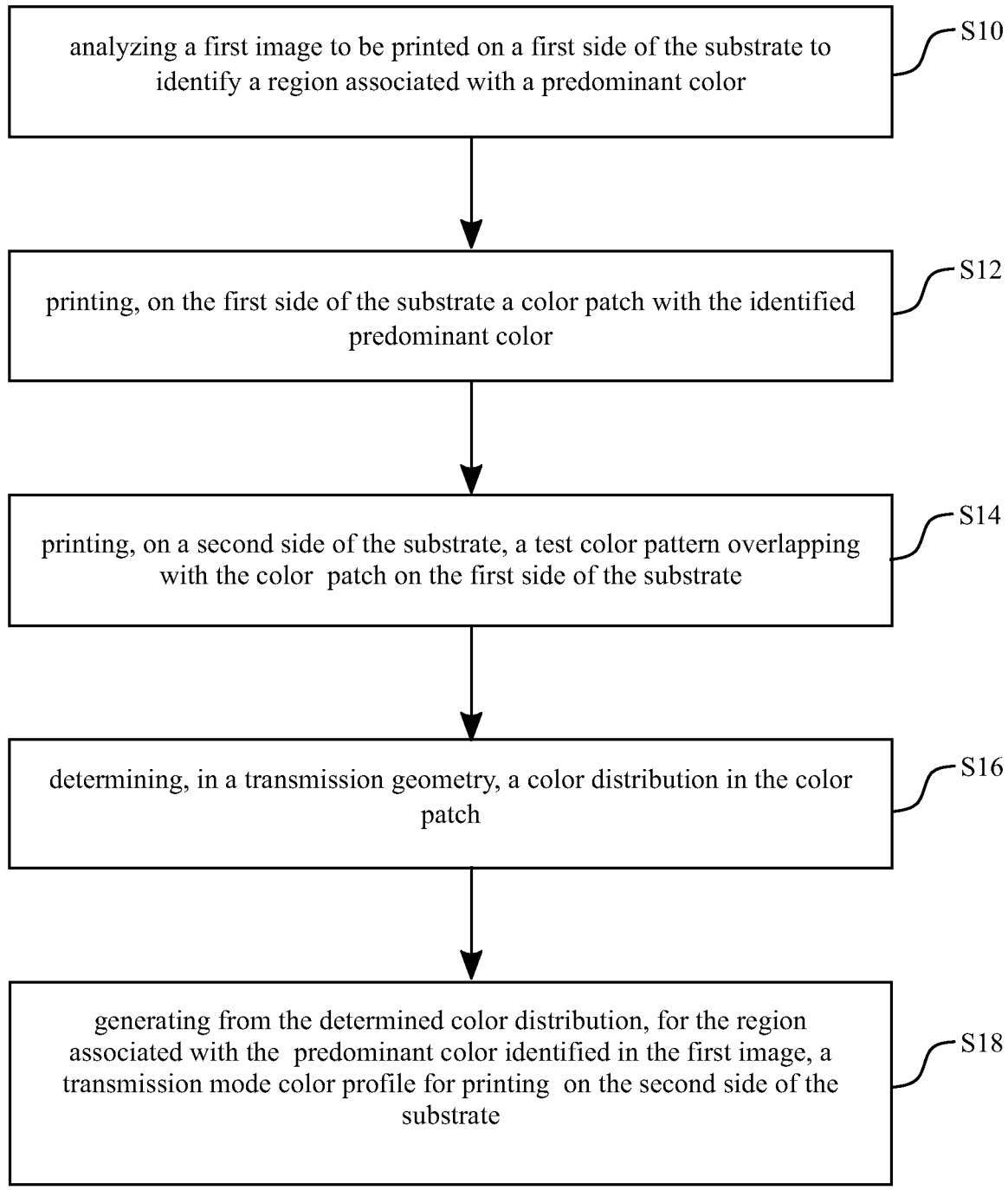
FIG. 1 illustrates a flow diagram of an image generation method according to an example.

FIG. 1 illustrates a method of generating a composite image on a semitransparent substrate, according to an example. The method comprises analyzing a first image to be printed on a first side of the substrate to identify a region associated with a predominant color (S10). The method further comprises printing, on the first side of the substrate, a color patch with the identified predominant color (S12), and printing, on a second side of the substrate, a test color pattern overlapping with the color patch on the first side of the substrate (S14). Further, the method comprises determining, in a transmission geometry, a color distribution in the color patch (S16), and generating from the determined color distribution, for the region associated with the predominant color identified in the first image, a transmission mode color profile for printing on the second side of the substrate (S18).

The substrate may be any substrate on which a printing fluid can be applied. In the following, the functionality of printers, systems or methods according to examples will be described with respect to a substrate made of a semitransparent polymer sheet, such as PVC, PP, PE, or the like; however, any substrate may be used. For example, the substrate may be or comprise paper and/or paper-based material, such as cardboard, textiles, leather, polymers, glass and/or combinations thereof, etc. The substrate may be a flat sheet of material and the second side of the substrate may be opposite to the first side of the substrate.

The word transparent as used herein corresponds to a degree of transparency with respect to visible light which allows substantially unobstructed passage of light through the substrate, but the described techniques may nonetheless be extended to wavelengths of light outside of the human visible range. Semitransparent may be interpreted as providing a noticeable reduction in light intensity as compared to a transparent substrate without completely blocking the passage of transmitted light.

The printing fluid may be any appropriate material suitable to print an image onto the substrate, such as ink. A printed image and/or a composite or perceived image may be a digitized color distribution, text, lines, shapes, letters, numerals, signs, symbols or a combination of these in an arbitrary color, alignment or shape.

The composite or perceived image can comprise at least a contribution of the first image, such as the transmission or reflectance properties of the printed first image. In some examples, the perceived image is different from the first image when the substrate is partially exposed to a light source, is at least partially subjected to illumination on the second side of the substrate, is partly backlit, or the like.

To account for the effect of the first image on the perceived image, the first image is analyzed to identify the region associated with predominant colors. In some examples, a plurality of regions each associated with a plurality of predominant colors is identified, such as to identify regions in all of or in a predominant portion of the first image, for example: to identify regions in at least 50% of the first image; to identify regions in at least 80% of the first image; or as shown in the method of FIG. 1 wherein the method is performed for each region in the image. To analyze the first image, in some examples, computer readable image data or design data, or a printed image, or a digitized version of a printed image is analyzed to identify the region associated with the predominant color.

The predominant color may be a characterizing color of the region, a color characterizing the average transmission, absorption and/or reflection properties of the region, or the most prominent color according to human color perception in the region. In some examples, the predominant color represents the average reflection, absorption and/or transmission properties of a plurality of colors in the region. The plurality of colors may be represented by a plurality of color values, wherein a color value may relate to a numerical representation of a color in a color space, such as a RGB, CMYK, CIEXYZ or CIELAB value. Said plurality of color values may be all color values in the region or at least a predominant portion of the color values in the region, such as at least 50% of the color values in the region or at least 80% of the color values in the region.

In some examples, the predominant color is determined as a mean color value or median color value of a plurality of color values present in the region associated with the predominant color or corresponds to a mean or median value of measured property values representing the colors in the region.

In some examples, the plurality of color values in the region associated with the predominant color have a maximum color difference from the predominant color, the color difference being smaller than a given threshold. In some examples, the color difference is according to a perceptually uniform color measure, such as a Euclidean distance in the CIELAB color space.

The analysis of the first image to identify a region associated with a predominant color can be at least partially performed by an operator of an image generation system or printer calibration system, which are examples of systems for implementing the method. For example, the operator may define a predominant color to identify a corresponding region or may define a region for identifying a corresponding predominant color as part of a semi-automatic analysis, or the region and their respective predominant colors may be automatically identified by a processing resource performing an image analysis based on the definition of the predominant color by the operator, or any combination thereof.

In some examples, the operator predefines analysis criteria, such as a region, a number of regions and/or a color to analyze the first image, and a processing resource analyzes the first image to identify a region associated with the predominant color according to the predefined analysis criteria.

After the analysis, the first image may be associated with a plurality of identified regions, each identified region being associated with a predominant color.

A non-identified region of the first image, which is not associated with a predominant color after the analysis, may be attributed with a base color as the predominant color, or with the predominant color of the closest neighboring region, or with the predominant color having the smallest color difference to the colors in the non-identified region, or any combination thereof. The base color may be printer specific, or may be associated with the type of substrate, or may correspond to a mean color of the first image or of at least one non-identified region, or any combination thereof. The closest neighboring region may be the identified region sharing the longest boundary with the non-identified region.

Thus, in some examples, the first image may be partitioned into a plurality of regions, wherein each of the regions of the plurality of regions is associated with a predominant color.

In some examples, non-identified regions are considered as comprising identical colors on the first and second sides of the substrate, and a corresponding transmission mode color profile is directly attributed to said non-identified regions.

A color patch with the identified predominant color can then be printed on the first side of the substrate, and a test color pattern is printed on the second side of the substrate, the test color pattern overlapping with the color patch on the first side of substrate. The first side and the second side may be opposite sides of the substrate.

The test color pattern comprises a plurality of sections each having one color value. In some examples, the test color pattern comprises an array of regularly distributed colored sections, such as rectangles and squares, each of the colored sections having a different color, wherein the number of colored sections in the test color pattern is larger than 700, or larger than 1000, or larger than 1500.

In some examples, each section of the test color pattern on the second side of the substrate overlaps with the color patch on the first side of the substrate, such that the superposition of each color from the test color pattern with the predominant color can be identified in the color patch.

From the printed test color pattern overlapping the color patch on a different side of the substrate, a color distribution in the color patch is determined. Said color distribution in the color patch may be used to account for the effect of the region associated with the predominant color on an image printed on the second side of the substrate, such as to generate a composite image with images on both the first and second sides of the substrate.

To determine the color distribution, the substrate having printed thereon the patch of the predominant color on the first side and the test color pattern on the second side can be measured in a transmission geometry. The transmission geometry may relate to an arrangement of a detector and a light source, wherein the detector and the light source are arranged such that, when the first side of the substrate is illuminated with the light source, the detector may detect transmitted light at least partially transmitted through the substrate at the second side of the substrate, or vice versa. Thus, the light detected with the detector may contain information on the transmission properties of an overlap of the color patch and the test color pattern and may hence allow to identify the color distribution in the color patch overlapping with the test color pattern.

The color distribution may be represented as numerical values of a profile connection space. The profile connection space may be a numerical color representation representing a color with color values and covering a large gamut of the human visible color range, such as the CIELAB or CIEXYZ color spaces; although in principle any profile connection space may be used.

Using the determined color distribution in the color patch, a transmission mode color profile for printing on the second side of the substrate in the region associated with the predominant color may be determined by providing a mapping between colors in the test color pattern and the colors in the determined color distribution. A complete color profile for printing on the second side of the substrate in the region associated with the predominant color may be determined from said mapping by interpolation between the color values in the mapping.

In particular, this mapping creates a connection between printer internal color representations, such as amounts of differently colored inks, and corresponding colors of the profile connection space. Thus, using the transmission mode color profile, an intended color can be transformed via the profile connection space to a printer internal color representation for printing on the second side of the substrate in the region associated with the predominant color, such as to generate the intended color in the perceived composite image.

A color patch and corresponding test pattern may be printed on the substrate for each predominant color, such as to provide a transmission mode color profile for each identified region of the first image.

Figure 2:
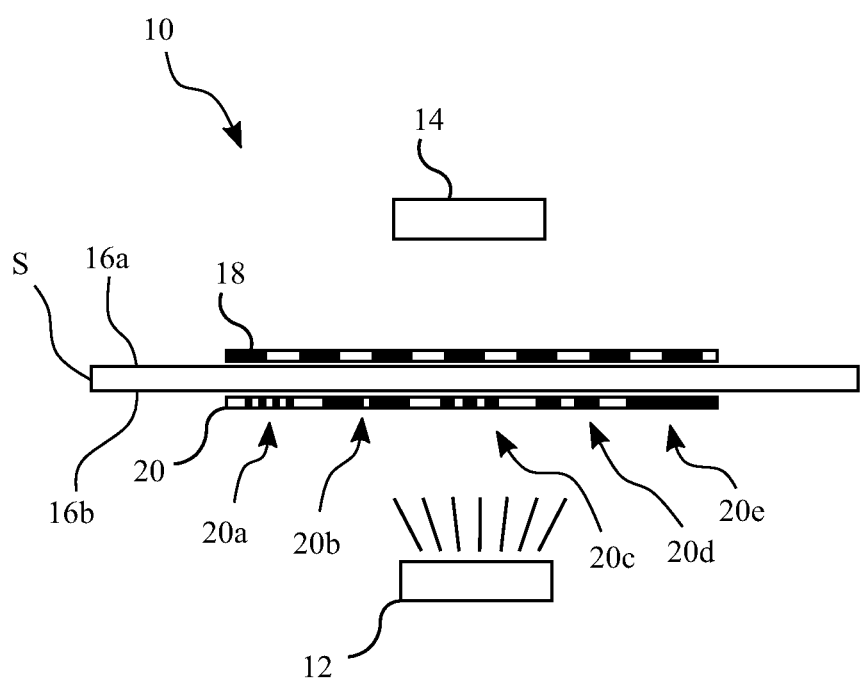
FIG. 2 illustrates the determination of a color distribution in transmission geometry according to an example.

FIG. 2 shows an apparatus 10 for determining a color distribution in the color patch 18 in a transmission geometry according to an example. The apparatus 10 for determining the color distribution in the color patch 18 comprises a light source 12 and a detector 14. A substrate S is arranged between the light source 12 and the detector 14. A color patch 18 is printed on a first side 16a of the substrate S and a test color pattern 20 is printed on a second side 16b of the substrate S. The test color pattern 20 comprises color sections 20a to 20e, each having a different color.

In FIG. 2, different colors are illustrated as different black-and-white patterns. However, a color may correspond to any substantially uniform substrate feature, which is suitable to provide a distinguishing character to a substrate region, which is distinguishing to the human eye upon illumination with light, such as wavelength dependent reflection, absorption and/or transmission properties of the surface of the substrate S and/or of particles adherent to or implanted in the substrate S and/or combinations and/or patterns thereof.

The light source 12 may illuminate the substrate S and the detector 14 may collect light originating from the substrate S to derive a spatial distribution of the color of the substrate S in the color patch 18. For example, the detector 14 may be a spectrophotometer or colorimeter to determine the perceived color which would be perceived by a human eye spatially resolved in the color patch 18. In other words, the apparatus 10 may determine a color distribution produced by the superposition of the test color pattern 20 and the color patch 18 with the predominant color on opposite sides 16a, 16b of the substrate S.

In some examples, the light source 12 provides light with an intended illumination profile, the intended illumination profile corresponding to an illumination source used to generate the composite perceived image after printing. In some examples, the light source 12 provides a substantially continuous spectrum of wavelengths, such as white light.

In some examples, the detector 14 corresponds to a spectrophotometer to analyze the intensity of the light originating from the light source 12 after it is transmitted through the substrate S at a certain location of the substrate S, the measured intensity value of the light at the certain location being measured as a function of the wavelength of the transmitted light, to determine the perceived color to a (human) observer at said location.

From the determined color distribution, for the region associated with the predominant color identified in the first image, a transmission mode color profile for printing on the second side 16b of substrate S can be determined.

The color distribution may also be determined in the inverse direction, such as by arranging the light source 12 at the first side 16a of the substrate S and arranging the detector 14 at the second side 16b of the substrate S.

In other words, determining the color distribution in the color patch 18 may comprise illuminating the first side 16a or the second side 16b of the substrate S, and measuring, on the first side 16a or the second side 16b the color distribution of the transmitted light with a spectrophotometer or colorimeter.

Figure 3:
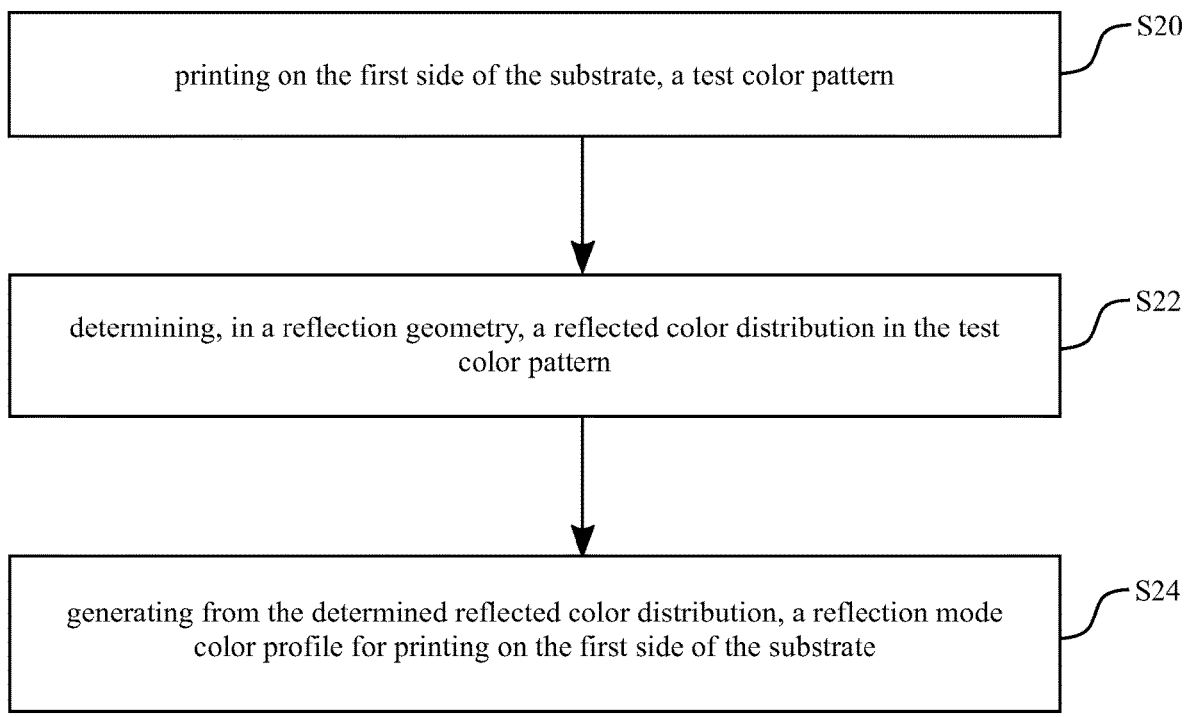
FIG. 3 illustrates a flow diagram of a method for determining a reflection mode color profile according to an example.

FIG. 3 illustrates a method for generating a reflection mode color profile for printing on the first side 16a of the substrate S, such as for printing the color patch 18, which can be combined with the method illustrated in FIG. 1. The method comprises printing on the first side 16a of the substrate S, a test color pattern 20 (S20), determining, in a reflection geometry, a reflected color distribution in the test color pattern 20 (S22), and generating from the determined reflected color distribution, a reflection mode color profile for printing on the first side 16a of the substrate S (S24).

A reflection geometry may be considered an arrangement where the substrate is exposed to illumination from a light source on an investigated side of the substrate, such as the first side of the substrate, and a detector collects light at least partially reflected of said investigated side of the substrate, such as to determine the reflectance properties of the investigated side of the substrate.

The reflection mode color profile may be used to adjust the printing on the first side 16a to the printer, substrate type, image, and/or lighting conditions and may increase a color accuracy for printing on the first side 16a of the substrate S over a native color profile of the printer, such as for printing the first image. In some example, the color patch on the first side of the substrate is printed using the reflection mode color profile.

Figure 4:
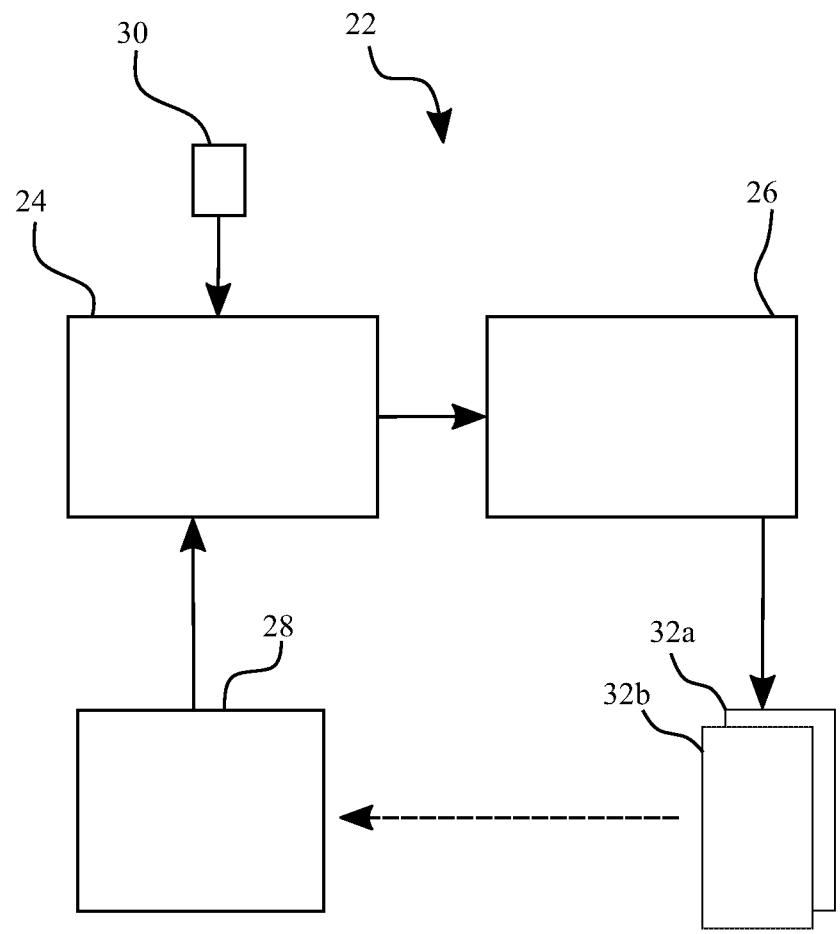
FIG. 4 illustrates a system for generating an image according to an example.

FIG. 4 illustrates an example of a system 22 for generating an image on a substrate S. The system 22 comprises an analyzer 24 to identify a region associated with a predominant color in a first image 30. The system 22 further comprises a controller 26 to prepare a first print job 32a including a color patch 18 having the identified predominant color, and a second print job 32b including a test color pattern 20. The controller 26 can control a printer to print the first print job 32a on a first side 16a of a substrate S and the second print job 32b on a second side 16b of the substrate S so that the test color pattern 20 and the color patch 18 overlap on opposite sides 16a, 16b of the substrate S.

The system 22 further comprises a meter 28 to determine a color distribution in a print result of the first and second print jobs 32a, 32b, the color distribution to be determined in a transmission geometry. The analyzer 24 can receive the determined color distribution and generates a transmission mode color profile for printing on the second side 16b of the substrate S based on the determined color distribution.

In some examples, the system 22 further comprises a printer to print the first and second print jobs 32a, 32b.

In some examples, the meter 28 further comprises a light source 12 and a spectrophotometer or colorimeter, such as illustrated for the apparatus 10 of FIG. 2. In some examples, the light source 12 is part of the spectrophotometer or colorimeter.

In some examples, at least part of the functionality of the system 22 is implemented by at least one processing resource, such as by executing machine readable instructions of a computer program or computer program product on at least one processing resource. The processing resource may be a processor for a computer, an ASIC, an FPGA, or any other processing resource capable of implementing the method from the machine readable instructions, including control devices operating based on hardware or a combination of hardware and software. It can include an integrated memory or communicate with an external memory or both. The same controller 26 or separate controllers may be provided for printing control and for image analysis. Different parts of the controller 26 may be located internally or externally to the printer or the analyzer 24, in a concentrated or distributed environment. The analyzer 24 may be part of the printer or a separate device.

The processing resource can be connected to device-interfaces for controlling external devices, such as for storing, sending and/or receiving data, as well as for printing and/or displaying graphical content and/or can be connected to human-machine interfaces for receiving user input as part of implementing the method. In some examples, the at least one processing resource implements the method illustrated in FIG. 1 or the variations of the method of generating an image as described herein.

In some examples, a non-transitory machine readable medium may be provided, the machine readable medium storing machine readable instructions that when executed cause the at least one processing resource to identify a region associated with a predominant color in a first image 30, prepare a first print job 32a including a color patch 18 having the identified predominant color, prepare a second print job 32b including a test color pattern 20, instruct a printer to print the first and second print jobs 32a, 32b on opposite sides 16a, 16b of the substrate S with the test color pattern 20 overlapping the color patch 18, receive a color distribution of the printed color patch, and generate a transmission mode color profile for printing on the second side 16b of the substrate S.

Hence, the method implemented according to the machine readable instructions by the processing resource may provide the functionality of the analyzer 24 and the controller 26 of the system 22.

An application for the aforementioned methods and systems, according to an example, may be day-and-night-printing. Day-and-night-printing corresponds to printing on a substrate S, such that after printing on the substrate 5, different images are perceived depending on whether light is reflected off the first side 16a of the substrate S or whether light is transmitted from the second side 16b to the first side 16a of the substrate S.

For example, a substrate S may show a first perceived image 30 on the first side 16a when illuminated by daylight, while a different perceived image may be presented on the first side 16a when the substrate S is back-lit by a light source 12 illuminating the second side 16b of the substrate S.

Figure 5:
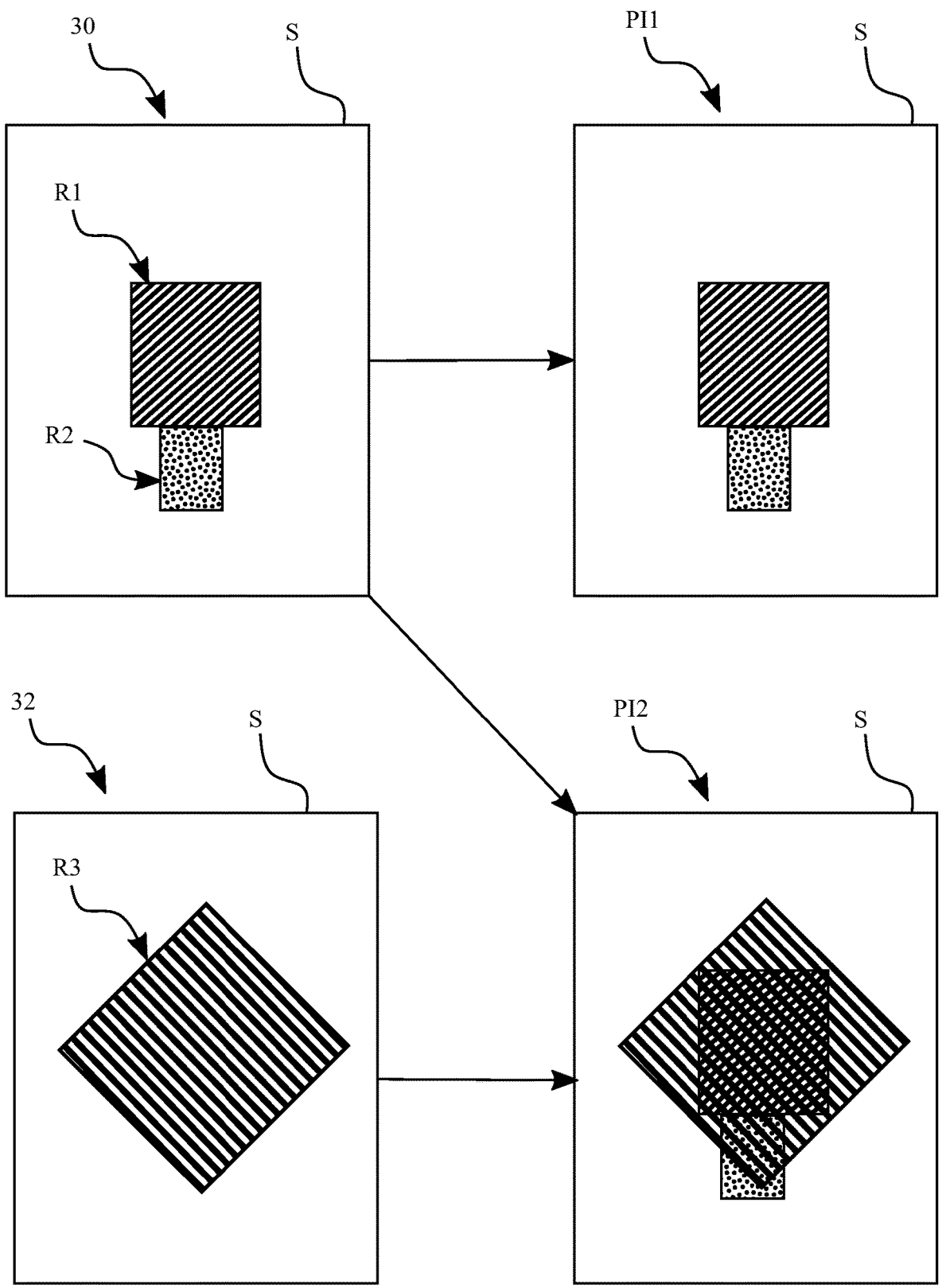
FIG. 5 illustrates image generation with images on opposite side of a substrate in different lighting conditions according to an example.

FIG. 5 illustrates the perceived images PI1, PI2 for two different lighting conditions according to an example. A first image 30 with regions R1, R2 having different predominant colors is printed on the first side 16a of the substrate S and a second image 32 having a region R3 with a further predominant color is printed on the second side 16b of the substrate S.

When light is reflected off the first side 16a of the substrate S, such as a semitransparent substrate 5, a contribution of the second printed image 32 to the perceived image PI1 can be low, such that the perceived image PI1 may correspond substantially to the first printed image 30. In some examples, the substrate S is semitransparent to such a degree that, when day-light is reflected off the one side of the substrate S, an image printed on an opposite side of the substrate S is not or barely observable to a human eye.

When the substrate S is illuminated from the second side 16b of the substrate S, the perceived image PI2 may correspond to a superposition of the transmittance properties of the first printed image 30, the second printed image 32, and the substrate S as shown in FIG. 5.

However, the superposition of first and second printed images 30, 32 on opposite sides 16a, 16b of a substrate S may lead to color interference in regions where the first and second printed images 30, 32 are overlapping.

Figure 6:
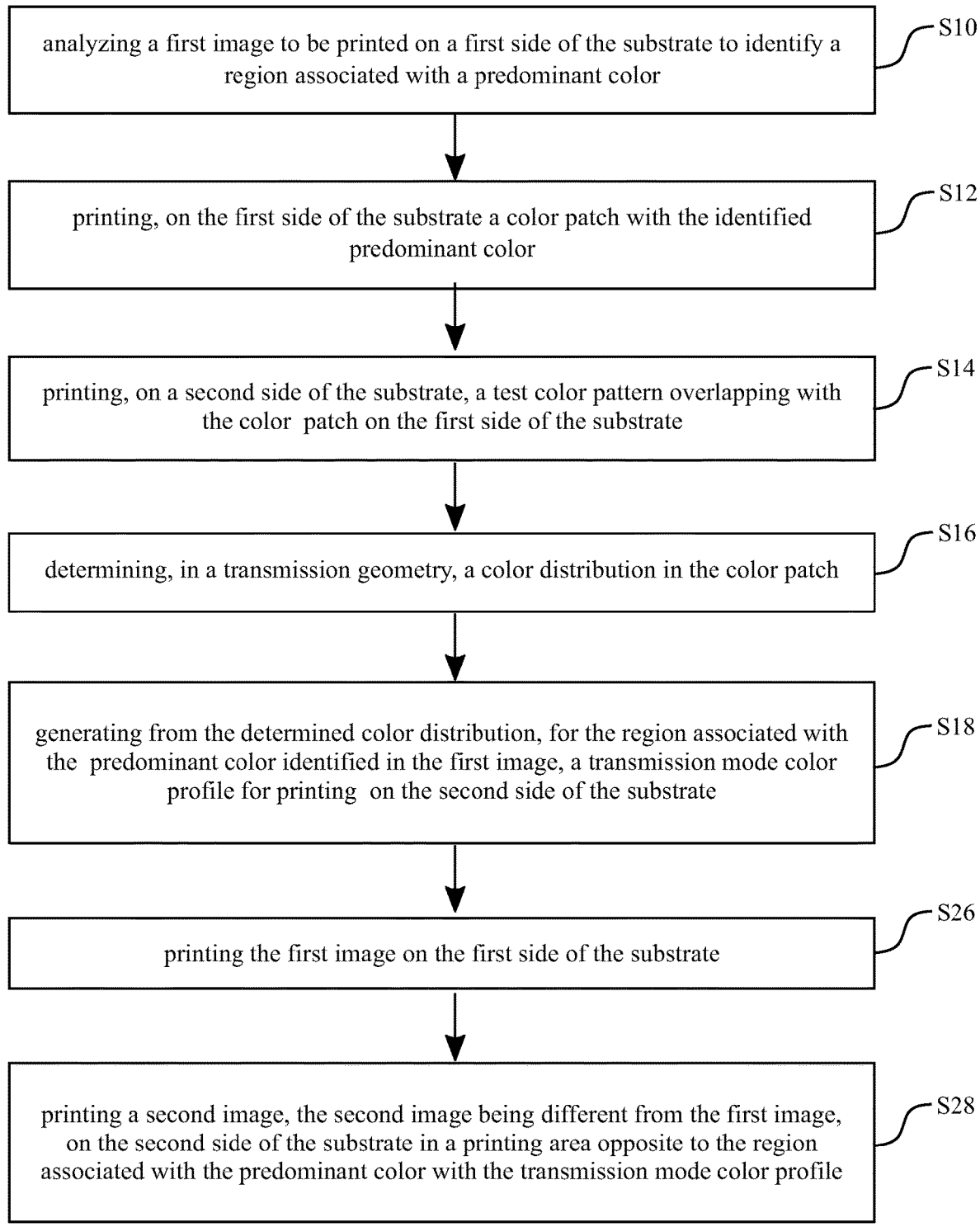
FIG. 6 illustrates a flow diagram of an image generation method according to another example.

FIG. 6 illustrates a method for generating an image, such as for day-and-night-printing, the method corresponding to the method illustrated in FIG. 1, but additionally comprising printing the first image 30 on the first side 16a of the substrate S (S24), and printing a second image 32, the second image 32 being different from the first image 30, on the second side 16b of the substrate S in a printing area opposite to the region R1, R2 associated with the predominant color with the transmission mode color profile (S26).

Using the transmission mode color profile for printing on the second side 16b of the substrate S in the regions R1, R2 associated with the respective predominant color, the perceived image PI2 may be a color accurate image generated by a superposition of images including the first and second printed images 30, 32.

Color accuracy of a patch of color may refer to a perceived color in said patch, which corresponds to the intended color for said patch or deviates from the intended color by less than a certain threshold. The threshold may be a given application specific threshold or may correlate to the human eye so that the color appears within visually or numerically acceptable boundaries, such as being indistinguishable from the intended color to the human eye.

In some examples, color accuracy of the perceived image PI2 relates to a degree of consistency in the colors of the perceived image PI2, such that the same intended color at different locations of the second image 32, which are overlapping with the first printed image 30, is perceived in the perceived image PI2 as being the same color or deviating from the same color by less than said threshold.

In other words, using the color profile for the second side 16b, the second image 32 printed on the second side 16b of the substrate S may be printed as a complementary image, such that the superposition of the first printed image 30 and the second printed image 32 generates the composite image on the first side 16a, when the substrate S is illuminated from the second side 16b, wherein the colors in the second image 32 may be perceived as color accurate by an observer.

Particularly, the second image 32 may be perceived by an observer, when the substrate S is illuminated from the second side 16b. Thus, the image generated by the method according to FIG. 6 may result in a day-and-night image, such that, when the substrate S is illuminated from its first side or front side 16a, such as by daylight, and light is accordingly reflected off the first side 16a of the substrate S, the first image 30 is perceived by an observer and, when the substrate is illuminated on the second side or backside 16b, such as by an artificial light source, the second image 32 may be perceived by an observer.

What is claimed is:

1. A method of generating an image on a transparent or semitransparent substrate, the method comprising
   analyzing a first image to be printed on a first side of the substrate to identify a region associated with a predominant color,
   printing, on the first side of the substrate a color patch with the identified predominant color,
   printing, on a second side of the substrate, a test color pattern overlapping with the color patch on the first side of the substrate,
   determining, in a transmission geometry, a color distribution in the color patch, and
   generating from the determined color distribution, for the region associated with the predominant color identified in the first image, a transmission mode color profile for printing on the second side of the substrate.

2. The method of claim 1 further comprising
printing on the first side of the substrate, a test color pattern,
determining, in a reflection geometry, a reflected color distribution in the test color pattern, and
generating from the determined reflected color distribution, a reflection mode color profile for printing on the first side of the substrate.

3. The method of claim 2, wherein the color patch on the first side of the substrate is printed using the reflection mode color profile.

4. The method of claim 1, wherein the second side is opposite to the first side.

5. The method of claim 4, further comprising
printing the first image on the first side of the substrate, and
printing a second image, the second image being different from the first image, on the second side of the substrate in a printing area opposite to the region associated with the predominant color with the transmission mode color profile.

6. The method of claim 1, wherein the predominant color is determined as a mean color value or median color value of a plurality of color values present in the region associated with the predominant color, and
wherein the plurality of color values in the region associated with the predominant color have a maximum color difference from the predominant color, the color difference being smaller than a given threshold.

7. The method of claim 6, wherein the color difference is according to a perceptually uniform color measure, such as a Euclidean distance in the CIELAB color space.

8. The method of claim 1, wherein a plurality of regions associated with respective predominant colors is identified in the first image,
wherein a color patch is printed on the first side of the substrate and a corresponding test color pattern overlapping with the color patch is printed on the second side of the substrate for each of the predominant colors,
wherein a color distribution is determined in each color patch, and
wherein a transmission mode color profile is generated for each of the predominant colors from the determined color distribution in the respective color patch associated with the predominant color.

9. The method of claim 1, wherein the color test pattern comprises an array of regularly distributed colored sections, each of the colored sections having a different color, wherein the number of colored sections in the color test pattern is larger than 700, or larger than 1000, or larger than 1500.

10. The method of claim 1, wherein computer readable image data or design data, or a printed image, or a digitized version of a printed image is analyzed to identify the region associated with the predominant color.

11. The method of claim 1, wherein determining the color distribution in the color patch comprises
illuminating the second or first side of the substrate, and
measuring, on the first or second side, the color distribution of the transmitted light with a spectrophotometer or colorimeter.

12. A system for generating an image on a substrate, the system comprising
an analyzer to identify a region associated with a predominant color in a first image, and
a controller to prepare
a first print job including a color patch having the identified predominant color, and
a second print job including a test color pattern, and
to control a printer to print the first print job on a first side of a substrate and the second print job on a second side of the substrate so that the test color pattern and the color patch overlap on opposite sides of the substrate,
a meter to determine a color distribution in a print result of the first and second print jobs, the color distribution to be determined in a transmission geometry,
the analyzer further to receive the determined color distribution and to generate a transmission mode color profile for printing on the second side of the substrate.

13. The system of claim 12, further comprising a printer to print the first and second print jobs.

14. The system of claim 12, further comprising a light source and a spectrophotometer or colorimeter as said meter.

15. A non-transitory machine readable medium storing machine readable instructions that when executed cause at least one processing resource to
identify a region associated with a predominant color in a first image,
prepare a first print job including a color patch having the identified predominant color, prepare a second print job including a test color pattern,
instruct a printer to print the first and second print jobs on opposite sides of the substrate with the test color pattern overlapping the color patch,
receive a color distribution of the printed color patch, and
generate a transmission mode color profile for printing on the second side of the substrate.

\* \* \* \* \*